(12) United States Patent
Greager et al.

(10) Patent No.: US 11,618,860 B2
(45) Date of Patent: Apr. 4, 2023

(54) MANUFACTURE OF A SYNTHETIC FUEL

(71) Applicant: Velocys Technologies Ltd, Oxford (GB)

(72) Inventors: Ivan Philip Greager, Houston, TX (US); Roger Allen Harris, Houston, TX (US); Neil Alexander King, Oxford (GB); Soumitra R. Deshmukh, Houston, TX (US); Zheyan Qiu, Sugar Land, TX (US)

(73) Assignee: Velocys Technologies Ltd., Oxford (GB)

(*) Notice: Subject to any disclaimer, the term of this patent is extended or adjusted under 35 U.S.C. 154(b) by 3 days.

(21) Appl. No.: 17/224,744

(22) Filed: Apr. 7, 2021

(65) Prior Publication Data

US 2021/0317375 A1    Oct. 14, 2021

Related U.S. Application Data

(60) Provisional application No. 63/007,920, filed on Apr. 9, 2020.

(30) Foreign Application Priority Data

May 7, 2020 (GB) ...................................... 2006826

(51) Int. Cl.
*C10K 1/00* (2006.01)
*C01B 32/50* (2017.01)
(Continued)

(52) U.S. Cl.
CPC ............... *C10K 1/004* (2013.01); *C01B 3/56* (2013.01); *C01B 32/50* (2017.08); *C10G 2/30* (2013.01);
(Continued)

(58) Field of Classification Search
CPC ..... C01B 2203/0283; C01B 2203/0425; C01B 2203/0485; C01B 2203/062;
(Continued)

(56) References Cited

U.S. PATENT DOCUMENTS 3,540,867 A    11/1970 Baron et al.
4,073,862 A    2/1978 Haese
(Continued)

FOREIGN PATENT DOCUMENTS

CN    105505480 A    4/2016
EP    0629685 B1    1/1999
(Continued)

OTHER PUBLICATIONS

Examination Report under Section 18(3) for related Great Britain Application No. GB2006826.8 dated Feb. 19, 2021.
(Continued)

*Primary Examiner* — Jafar F Parsa
(74) *Attorney, Agent, or Firm* — Renner, Otto, Boisselle & Sklar, LLP (57) ABSTRACT

The present invention provides a process for the manufacture of a useful product from carbonaceous feedstock of fluctuating compositional characteristics, the process comprising the steps of: continuously providing the carbonaceous feedstock of fluctuating compositional characteristics to a gasification zone; gasifying the carbonaceous feedstock in the gasification zone to obtain raw synthesis gas; sequentially removing ammoniacal, sulphurous and carbon dioxide impurities from the raw synthesis gas to form desulphurised gas and recovering carbon dioxide in substantially pure form; converting at least a portion of the desulphurised synthesis gas to a useful product. Despite having selected a more energy intensive sub-process i.e. physical absorption for removal of acid gas impurities, the overall power
(Continued)

requirement of the facility is lower on account of lower steam requirements and thereby leading to a decrease in the carbon intensity score for the facility.

20 Claims, 1 Drawing Sheet (51) Int. Cl.
  *C01B 3/56* (2006.01)
  *C10G 2/00* (2006.01)
  *C10G 65/12* (2006.01)
  *C10K 1/10* (2006.01)
  *C10K 1/32* (2006.01)
  *C10K 3/04* (2006.01)

(52) U.S. Cl.
  CPC .............. *C10G 65/12* (2013.01); *C10K 1/002* (2013.01); *C10K 1/005* (2013.01); *C10K 1/10* (2013.01); *C10K 1/32* (2013.01); *C10K 3/04* (2013.01); *C01B 2203/0283* (2013.01); *C01B 2203/0425* (2013.01); *C01B 2203/0485* (2013.01); *C01B 2203/062* (2013.01); *C01B 2203/0894* (2013.01); *C01B 2203/1211* (2013.01); *C01B 2203/146* (2013.01); *C01B 2203/148* (2013.01); *C01B 2203/86* (2013.01); *C10G 2300/1022* (2013.01); *C10G 2400/04* (2013.01); *C10G 2400/08* (2013.01)

(58) Field of Classification Search
  CPC ..... C01B 2203/0894; C01B 3/56; C10G 2/30; C10G 65/12; C10K 1/002
  See application file for complete search history.

(56) References Cited

U.S. PATENT DOCUMENTS

| 4,810,417 | A | 3/1989 | Diemer et al. |
| 5,470,361 | A | 11/1995 | Linke et al. |
| 2010/0051875 | A1* | 3/2010 | Chornet ................... C01B 3/38 252/373 |
| 2011/0000366 | A1 | 1/2011 | Koss et al. |
| 2011/0113676 | A1 | 5/2011 | Mackay et al. |
| 2015/0377079 | A1* | 12/2015 | Noureldin ................ C10K 1/02 60/671 |

FOREIGN PATENT DOCUMENTS

| EP | 2350233 B1 | 9/2020 |
| JP | 2015013940 A | 1/2015 |
| WO | 2009013233 A2 | 1/2009 |
| WO | 2009132449 A1 | 11/2009 |
| WO | 2011141635 A1 | 11/2011 |
| WO | 2013009419 A1 | 1/2013 |
| WO | 2013186441 A1 | 12/2013 |
| WO | 2015042315 A1 | 3/2015 |
| WO | 2016178915 A1 | 11/2016 |
| WO | 2017011025 A1 | 1/2017 |
| WO | 2017039741 A1 | 3/2017 |
| WO | 2018026388 A1 | 2/2018 |

OTHER PUBLICATIONS

Examination Report under Section 18(3) for related Great Britain Application No. GB2006826.8 dated Jan. 14, 2022.
Intention to Grant under Section 18(4) for related Great Britain Application No. GB2006826.8 dated Feb. 14, 2022.
Combined Search and Examination Report for related Great Britain Application No. GB2006826.8 dated Aug. 20, 2020.
International Search Report for related International Application No. PCT/EP2021/058754 dated Jun. 22, 2021.

* cited by examiner

MANUFACTURE OF A SYNTHETIC FUEL

This application claims the benefit of U.S. Provisional Patent Application No. 63/007,920, filed Apr. 9, 2020, and claims priority to UK Patent Application No. GB 2006826.8, filed May 7, 2020, the disclosures of which are incorporated herein by reference in their entireties.

TECHNICAL FIELD

The present invention concerns a chemical engineering process for the production of useful products, for example synthetic fuels, from waste materials and/or biomass in a manner which reduces the carbon intensity of the process in comparison with conventional processes of the type.

BACKGROUND

It is widely known in the art to manufacture useful products such as synthetic fuels from waste materials and/or biomass. We may refer to such manufacturing methods as WTL (Waste-to-Liquids) and BTL (Biomass-to-Liquids) processes.

Typical WTL and BTL processes involve the gasification by steam reforming of waste or biomass feedstock to produce a raw synthesis gas which may then be treated and purified in various ways before entering a chemical reaction train to generate a useful product.

In the case of the useful product being a synthetic fuel (for example a drop-in synthetic fuel), the chemical reaction train will typically comprise a Fischer-Tropsch (FT) reactor.

The FT process is widely used to generate fuels from carbon monoxide and hydrogen and can be represented by the equation:

$$(2n+1)H_2 + nCO \rightarrow C_nH_{2n+2} + nH_2O$$

Carbon intensity (also known as CI) is a measure of the amount of carbon used by or released from an industrial process relative to the tangible results of that process, often expressed as grams of $CO_2$ equivalent emitted per megajoule of energy produced by the process (or producible from the products of the process).

The term "Carbon Intensity" or "CI" may also be construed in accordance with a model based on an overall lifecycle assessment, for example forest to tailpipe. For example, GREET a publicly available spreadsheet model developed at Argonne National Laboratory (ANL) or a California-specific version of Argonne National Laboratory's GREET life cycle model used to calculate GHG emissions under the California Low Carbon Fuel Standard (LCFS) is the CA-GREET Version 3.0 (Tier 1) model. Other appropriate models are available such as the Biomethane & Biogas Carbon Calculator published by NNFCC Ltd, Biocentre, York Science Park, Innovation Way, York, YO10 5NY UK. Carbon intensity provides a measure of the overall energy efficiency of a process. Carbon intensity may be understood for example in terms of grams of $CO_2$ equivalent to per MJ of fuel produced.

It would be desirable to reduce carbon intensity in a chemical engineering process for the production of useful products, for example synthetic fuels, from waste materials and/or biomass, in order to afford a more environmentally beneficial process. The current environmental standards target in the US is that for an advanced biofuel produced in a WTL or BTL process to qualify for RINs (renewable identification number), a 60% or greater reduction in greenhouse gas emissions (measured as $gCO_2$-eq/MJ of fuel) is achieved compared to the baseline for a fuel derived from a refinery. Operationally it would be desirable to reduce the greenhouse gas emissions of any given synthetic fuel production pathway by at least 65%.

The problem of reducing carbon intensity in fuel production has been addressed to some extent in the art.

For example WO2015042315 discloses a method for reducing the carbon emissions intensity of a fuel which involves capturing a carbon dioxide fluid from a first hydrocarbon fluid production process; and injecting the captured carbon dioxide into a subterranean zone from one or more wellbores which is said to enhance the production of a second hydrocarbon fluid from the zone, at least one of the first or the second hydrocarbon fluids being said to be processable into a hydrocarbon fuel that includes a low carbon intensity fuel based, at least in part, on the captured and injected $CO_2$ fluid.

WO2013009419 discloses a low sulphur bunker fuels composition derived from blending various bio-oils with petroleum based heavy residual fuel oils and distillates where the final sulfur content and carbon intensity is controlled by the ratio of bio-oil to other heavy residual fuel oils and distillates.

To date, there appears to have been little consideration given as to how carbon intensity may be reduced in an otherwise satisfactory WTL or BTL process.

WTL and BTL processes are very well known in the art.

For example EP2350233A1 relates to a method for producing liquid hydro carbonaceous product from solid biomass, the method comprising gasifying solid biomass to produce raw synthesis gas, conditioning the raw synthesis gas to obtain purified synthesis gas and subjecting the purified gas to a Fischer-Tropsch synthesis.

WO2018026388 describes converting one or more carbon-containing feedstocks, for example plastics, agriculture residues, and forest remediation wood into hydrocarbons.

Some prior art WTL and BTL processes have sought to address environmental concerns.

For example, WO2017011025A1 and WO2017039741A1 disclose systems for producing high biogenic carbon concentration Fischer-Tropsch (F-T) liquids derived from municipal solid wastes (MSW), and a high biogenic content fuel derived from renewable organic feedstock sources.

Other prior art documents have considered ways of recovering carbon dioxide in production processes. For example, WO2016178915 discloses processes involving formation of hydrocarbons and oxygenated hydrocarbons through use of oxygen supplied by ion transport membranes. This document relates in part to a process involving steam reforming and subsequent production of a synthetic product where carbon dioxide and/or hydrogen downstream of the process is reclaimed to generate the synthetic product.

US20110000366A1 describes a process for the treatment of a $CO_2$-containing stream of process gas, which is obtained in the production of pure synthesis gas from raw gas in the partial oxidation of heavy oils, petroleum coke or wastes, or in the gasification of coal, or when processing natural gas or accompanying natural gas, $CO_2$ is removed physisorptively or chemisorptively, and the solvent loaded with $CO_2$ is expanded to a lower pressure for the desorption of $CO_2$. In order to generate $CO_2$ as pure as possible, the contaminated $CO_2$ is condensed to at least 60 bar[a] or below its critical temperature to at least 70 bar[a], and the impurities contained in the liquid $CO_2$ are removed by stripping with gaseous $CO_2$ guided in counterflow.

It would appear that none of these documents provides a satisfactory means for reducing carbon intensity in an otherwise functional WTL or BTL process.

The object of the present invention is to provide an improved process for manufacturing a useful product such as synthetic fuel from waste materials and/or biomass, in which the carbon intensity of the process is reduced in comparison with conventional such processes.

SUMMARY OF INVENTION

In a first aspect of the present invention there is provided a process for the manufacture of a useful product comprising:
   a. gasifying a carbonaceous feedstock comprising waste materials and/or biomass to generate a raw synthesis gas comprising $H_2$, CO, $CO_2$, at least one other carbonaceous material comprising at least $CH_4$ and tars, and contaminants comprising particulates, ammonia or HCl, and sulphurous gas; and optionally containing inert gas such as $N_2$;
   b. supplying at least a portion of the raw synthesis gas to a primary clean-up zone supplied with an aqueous stream at least partially to wash particulates and ammonia or HCl out of raw synthesis gas, the aqueous stream being selected to be a neutral or acidic aqueous stream when ammonia is a contaminant in the raw synthesis gas and being selected to comprise a basic aqueous stream when HCl is a contaminant in the raw synthesis gas, to provide an aqueous-washed raw synthesis gas comprising $H_2$, CO, $CO_2$ and contaminants comprising sulphurous gas;
   c. supplying at least a portion of the aqueous-washed raw synthesis gas to a secondary clean-up zone;
   d. contacting the aqueous-washed raw synthesis gas in the secondary clean-up zone with a physical solvent for sulphurous materials effective at least partially to absorb sulphurous materials from the aqueous-washed raw synthesis gas and recovering from the secondary clean-up zone an at least partially desulphurised, de-tarred aqueous-washed raw synthesis gas comprising $H_2$, CO, $CO_2$ and, optionally, remaining contaminants;
   e. supplying the at least partially desulphurised, de-tarred aqueous-washed raw synthesis gas to a tertiary clean-up zone;
   f. contacting the at least partially desulphurised, de-tarred aqueous-washed raw synthesis gas in the tertiary clean-up zone with a physical solvent for $CO_2$ effective at least partially to absorb $CO_2$ from the at least partially desulphurised, de-tarred aqueous-washed raw synthesis gas, and recovering from the tertiary clean-up zone a first stream comprising the physical solvent for $CO_2$ and absorbed $CO_2$, and a second stream comprising clean synthesis gas comprising $H_2$, CO and optionally remaining contaminants;
   g. removing at least part of the absorbed $CO_2$ from the first stream in a solvent regeneration stage to recover regenerated solvent and separately $CO_2$ in a form sufficiently pure for sequestration or other use;
   h. supplying the clean synthesis gas of the second stream, optionally after passage through one or more guard beds and/or alternative clean-up stages at least partially to remove any remaining contaminants, to a further reaction train to generate at least one useful product.

Steam saved by the use of physical solvent in step d. may be used in other parts of the plant further to reduce energy consumption. For example, drying of feedstock, heating process streams in different units, and heat tracing.

In a second aspect of the invention the raw synthesis gas recovered from the gasification stage may be at least partially de-tarred before clean-up by means of partial oxidation. Consequently, in its second aspect the invention provides a process for the manufacture of a useful product comprising:
   a. gasifying a carbonaceous feedstock comprising waste materials and/or biomass to generate a raw synthesis gas comprising $H_2$, CO, $CO_2$, at least one other carbonaceous material comprising at least $CH_4$ and tars, and contaminants comprising particulates, ammonia or HCl, and sulphurous gas and optionally containing inert gas such as $N_2$;
   b. partially oxidising the raw synthesis gas to provide a partially oxidised raw synthesis gas comprising $H_2$, CO, $CO_2$ and contaminants comprising particulates, ammonia or HCl, and sulphurous gas;
   c. optionally compressing and supplying at least a portion of the partially oxidised raw synthesis gas to a primary clean-up zone supplied with an aqueous stream at least partially to wash particulates and ammonia or HCl out of the partially oxidised raw synthesis gas, the aqueous stream being selected to be a neutral or acidic aqueous stream when ammonia is a contaminant in the partially oxidised raw synthesis gas and being selected to comprise a basic aqueous stream when HCl is a contaminant in the partially oxidised raw synthesis gas, to provide an aqueous-washed partially oxidised raw synthesis gas comprising $H_2$, CO, $CO_2$ and contaminants comprising sulphurous gas;
   d. supplying at least a portion of the aqueous-washed partially oxidised raw synthesis gas to a secondary clean-up zone;
   e. contacting the aqueous-washed partially oxidised raw synthesis gas in the secondary clean-up zone with a physical solvent for sulphurous materials effective at least partially to absorb sulphurous materials from the aqueous-washed partially oxidised raw synthesis gas and recovering from the secondary clean-up zone an at least partially desulphurised aqueous-washed partially oxidised raw synthesis gas comprising $H_2$, CO, $CO_2$ and, optionally, remaining contaminants;
   f. supplying the at least partially desulphurised aqueous-washed partially oxidised raw synthesis gas to a tertiary clean-up zone;
   g. contacting the at least partially desulphurised aqueous-washed partially oxidised raw synthesis gas in the tertiary clean-up zone with a physical solvent for $CO_2$ effective at least partially to absorb $CO_2$ from the at least partially desulphurised aqueous-washed partially oxidised raw synthesis gas, and recovering from the tertiary clean-up zone a first stream comprising the physical solvent for $CO_2$ and absorbed $CO_2$, and a second stream comprising clean synthesis gas comprising $H_2$, CO and optionally remaining contaminants;
   h. removing at least part of the absorbed $CO_2$ from the first stream in a solvent regeneration stage to recover regenerated solvent and separately $CO_2$ in a form sufficiently pure for sequestration or other use;
   i. supplying the clean synthesis gas of the second stream, optionally after passage through one or more guard beds and/or alternative clean-up stages at least partially to remove any remaining contaminants, to a further reaction train to generate at least one useful product.

The process of the invention reduces the carbon intensity of an otherwise practical WTL or BTL process in a number of ways, which are inter-related.

The inventors of the present invention have surprisingly found that a process according to the invention provides an effective method for reducing carbon intensity, which is superior to conventional methods in the art. This is because the process of the present invention reduces natural gas consumption and/or power import into the facility and/or utilizes saved steam from downstream processes for use in upstream stages. Therefore, the process according to the present invention is more environmentally friendly than conventional methods.

For example, the carbon dioxide recovered in the present invention is purer than that created using processes of the art. Therefore, additional clean up processes downstream are not required in the present invention. Further, the pure carbon dioxide recovered can be directly used for sequestration or commercialisation. This has a significant impact on carbon intensity.

Furthermore, although gas clean-up by physical absorption is more energy intensive than alternative chemical adsorption processes owing to the need for refrigeration of the physical absorption solvent, when evaluated over the entire facility, it is surprisingly found that the overall facility power import is reduced. This is at least partly because the quantity of steam needed for regeneration of chemical solvent is at least about an order of magnitude higher than that needed for physical solvent; therefore there is a reduced quantity of steam needed in the facility overall. A lower steam requirement reduces the natural gas import (or other source of fuel or energy) required to generate the steam. Additionally, some low pressure steam may also be available for drying of feedstock.

Thus, although the process of the invention selects a more energy intensive sub-process for gas clean-up, the overall power requirement of the facility is lower and thereby serves to decrease the carbon intensity score.

The carbonaceous feedstock may comprise at least one of woody biomass, municipal solid waste and/or commercial and industrial waste. The carbonaceous feedstock will have fluctuating compositional characteristics that are dependent on the source and chemistry of the feedstock used.

The process according to the present invention may ensure that there is little or no landfill or waste contaminating the environment. Additionally, there are no land use changes caused by fuel requirements when using the process in accordance with the present invention because the process of the invention has the capacity to handle a wide variety of feedstocks.

Non-recyclable waste is conventionally sent to landfill or incineration and woody biomass is conventionally left on a forest floor and/or may contribute to forest fires. The process according to the present invention provides a lower emissions route to process waste than incineration or landfill. Instead of being burnt, the carbon waste may be converted into a useful product such as sustainable fuel for use in aircraft or vehicles.

The use of a physical solvent to remove sulphur and carbon dioxide (acid gases) from the raw synthesis gas is a relatively energy intensive process requiring a larger power import compared to conventional chemical removal processes which are widely taught in the art, such as amine wash to remove carbon dioxide and liquid redox chemistry to remove sulphur owing to the refrigeration requirement for the physical solvent. However, the steam requirement in a plant operating a conventional chemical process for acid gas removal is at least two orders of magnitude higher than that of a plant operating in accordance with the inventive process to effect acid gas removal by physical absorption. This lower steam requirement reduces the energy requirement for steam generation and therefore reduces energy consumption for the overall process/facility. By removing sulphur and carbon dioxide physisorptively from the raw synthesis gas, the process of the invention reduces the net energy consumption (natural gas and power import) of the facility and thereby decreases carbon intensity in comparison with conventional processes.

Secondly, "saved steam" available on plant as a consequence of the use of physical as opposed to chemical acid gas removal stages may be used in other parts of the plant further to reduce energy consumption, as explained below in the Detailed Description of the invention relating to a process according to the invention in which the further reaction train is a Fischer-Tropsch reaction train. Generally, the steam available at LP (low pressure) level may be used to dry the feedstock in a biomass or waste boiler before supplying the dried feedstock to the gasifier and/or used in an oxygen heater in an air separation unit and/or for pre-heating the feedstream to one or more of the process stages. If further LP steam is available, it may be let down to the LLP header and used for the heating of guard bed(s) and/or in the upgrading section and/or in the wastewater stripping section (for example, wastewater reboiler) and/or in the fuel system (for example, natural gas heater) and/or in the deaerator and/or heating and tracing of intermediate or chemical storage tanks.

The inventors have found that drying the carbonaceous feedstock prior to gasification, particularly when using biomass or moist waste feedstock, contributes to a reduced carbon intensity. The drying of carbonaceous feedstock reduces the required amount of steam needed to be entered into the gasifier at the start of the process since it maximizes utilization of the heat of combustion (in gasification and partial oxidation units) towards heating the process reactions. Additionally, drying increases the fuel density (facilitating smaller storage) and the calorific value of the feedstock. If steam, or liquid water is present in the gasifier, additional heat (generated by combustion of fuel with oxygen) will be needed to compensate, costing energy. Drying the feedstock prior to gasification therefore overcomes the need for oxygen compensation. As oxygen is expensive, the drying of feedstock prior to gasification reduces cost of the overall process.

Drying the carbonaceous feedstock may result in the carbonaceous feedstock having a moisture content of less than about 20%, less than about 15% or less than about 10% by weight. Preferably, the carbonaceous feedstock has a moisture content of less than about 10% by weight.

Steam gained, or "saved" from downstream processes as mentioned above may be used to dry the carbonaceous feedstock.

The feedstock may be dried by a feedstock dryer prior to feeding the carbonaceous feedstock into a biomass or waste boiler. As a non-limiting example, the dryer may be a rotary tube dryer or a belt dryer.

Conventional processes typically use dryers to dry biomass or waste feedstock. Conventionally, dryers are huge consumers of natural gas and/or other forms of power, which is undesirable from a carbon intensity perspective. It is therefore desirable to reduce the amount of natural gas and/or power used to reduce the carbon intensity of the process.

The inventors have unexpectedly found that using at least a portion of steam gained from downstream processes, such as the low-steam physical absorption process, is advantageous for reducing carbon intensity. Steam gained from the low-steam physical absorption process, which would otherwise be used for cleaning raw synthesis gas, may be recycled and used to help dry the feedstock prior to feeding into the biomass or waste boiler. This reduction in carbon intensity has been achieved by substantially reducing or eliminating the need to provide fresh steam and/or natural gas to the dryer to aid drying the feedstock through the selection of a more energy intensive physical absorption process which realizes a global reduction in energy use. This makes the process more environmentally friendly than conventional methods in the art.

Other suitable drying options to dry carbonaceous feedstock may include using supplementary solar power, natural gas, electric dryers and/or microwave dryers. In certain cases, biomass and/or waste feedstock may be fired to generate the heat necessary in the drier.

When dry waste is used as the carbonaceous feedstock source, the feedstock may not need drying prior to entering the gasification zone. Dry waste may be fed directly into the gasifier following appropriate selection and comminution.

Consequently, the process of the invention may optionally comprise the step prior to gasification of drying the feedstock to a moisture content of less than, say 10% w/w. This step may be effected in a biomass or waste dryer supplied with low pressure steam available on plant to dry the feedstock prior to gasification.

Not all carbonaceous feedstocks derived from waste or biomass may need to be dried prior to gasification. If the moisture content of the feedstock is already less than, for example, 10% w/w then it may not be necessary to dry such a feedstock. However, in an operational WTL or BTL plant it is likely that the incoming feedstocks will be of variable composition, including with regard to moisture. In the event that the feedstock comprises more than, for example, 10% w/w moisture then drying the feedstock to a moisture content below, for example, 10% w/w is desirable. Excess moisture supplied with the feedstock into the gasifier causes the gasifier to require more power in the form of oxygen supplied to it. Such drying may be effected in a number of ways, as described above.

In the process of the invention the gasification stage may be effected at low pressure or at high pressure. By "low pressure" is meant below about 5 bar. By "high pressure" is meant above about 5 bar, for example above about 10 bar. In the event that high pressure gasification is used, a beneficial consequence for carbon intensity is that no compression of synthesis gas is required on entry to the primary clean-up stage.

The process of the invention may optionally include a shift reaction or adjustment stage for the purpose of adjusting the hydrogen to carbon monoxide ratio of the synthesis gas eventually supplied to the further reaction train.

Thus, according to a third aspect of the present invention there is provided a process for the manufacture of a useful product comprising:

a. providing a carbonaceous feedstock comprising waste materials and/or biomass;
b. supplying the carbonaceous feedstock to a gasification zone;
c. providing a steam supply and supplying the steam to the gasification zone;
d. elevating the temperature of the gasification zone to a temperature effective for gasification of the carbonaceous feedstock in the gasification zone;
e. contacting the carbonaceous feedstock with the steam in the gasification zone effective to produce a raw synthesis gas comprising $H_2$, CO, $CO_2$, at least one other carbonaceous material comprising at least $CH_4$, and contaminants comprising particulates, ammonia or HCl, sulphurous gas and optionally containing inert gas such as $N_2$;
f. recovering from the gasification zone the raw synthesis gas;
g. supplying at least a portion of the raw synthesis gas to a partial oxidation zone maintained at elevated temperature;
h. contacting the raw synthesis gas with an oxygen-containing gas in the partial oxidation zone effective at least partially to oxidise the at least one other carbonaceous material to provide a partially oxidised raw synthesis gas comprising $H_2$, CO, $CO_2$ and contaminants comprising particulates, ammonia or HCl, and sulphurous gas;
i. recovering the partially oxidised synthesis gas from the partial oxidation zone;
j. supplying at least a portion of the partially oxidised raw synthesis gas to a primary clean-up zone supplied with an aqueous stream at least partially to wash particulates and ammonia or HCl out of the partially oxidised raw synthesis gas, the aqueous stream being selected to be a neutral or acidic aqueous stream when ammonia is a contaminant in the partially oxidised raw synthesis gas and being selected to comprise a basic aqueous stream when HCl is a contaminant in the partially oxidised raw synthesis gas, to provide an aqueous-washed partially oxidised raw synthesis gas comprising $H_2$, CO, $CO_2$ and contaminants comprising sulphurous gas;
k. supplying at least a portion of the aqueous-washed partially oxidised raw synthesis gas to a secondary clean-up zone;
l. contacting the aqueous-washed partially oxidised raw synthesis gas in the secondary clean-up zone with a physical solvent for sulphurous materials effective at least partially to absorb sulphurous materials from the aqueous-washed partially oxidised raw synthesis gas and recovering from the secondary clean-up zone an at least partially desulphurised aqueous-washed partially oxidised raw synthesis gas comprising $H_2$, CO, $CO_2$ and, optionally, remaining contaminants;
m. supplying at least a first part of the at least partially desulphurised aqueous-washed partially oxidised raw synthesis gas to a shift reaction or adjustment zone and shifting the $H_2$ to CO ratio of the at least partially desulphurised aqueous-washed partially oxidised raw synthesis gas to a selected ratio to provide a shifted at least partially desulphurised aqueous-washed partially oxidised raw synthesis gas comprising $H_2$, CO, $CO_2$ and, optionally, remaining contaminants;
n. supplying the shifted at least partially desulphurised aqueous-washed partially oxidised raw synthesis gas, optionally after recombining it with at least part of any remaining part of the at least partially desulphurised aqueous-washed partially oxidised raw synthesis gas from step m to a tertiary clean-up zone;
o. contacting the shifted at least partially desulphurised aqueous-washed partially oxidised raw synthesis gas, optionally after recombining it with at least part of any remaining part of the at least partially desulphurised aqueous-washed partially oxidised raw synthesis gas from step m, in the tertiary clean-up zone with a physical solvent for $CO_2$ effective at least partially to absorb $CO_2$ from the shifted at least partially desulphurised aqueous-washed partially oxidised raw synthesis gas, and recovering from the tertiary clean-up zone a first stream comprising the physical solvent for $CO_2$ and absorbed $CO_2$, and a second stream comprising clean synthesis gas comprising $H_2$, CO and optionally remaining contaminants;

p. removing at least part of the absorbed $CO_2$ from the first stream in a solvent regeneration stage to recover regenerated solvent and separately $CO_2$ in a form sufficiently pure for sequestration or other use;

q. supplying the clean synthesis gas of the second stream, optionally after passage through one or more guard beds and/or alternative clean-up stages at least partially to remove any remaining contaminants, to a further reaction train to generate at least one useful product.

In a fourth aspect of the process according to the invention, the shift stage may be effected before rather than after the secondary clean-up stage (for example if the gas shift is a water gas shift and) if a sulphur-tolerant water gas shift catalyst is used in the water gas shift reaction zone). Consequently the present invention also provides a process for the manufacture of a useful product comprising:

a. providing a carbonaceous feedstock comprising waste materials and/or biomass;

b. supplying the carbonaceous feedstock to a gasification zone;

c. providing a steam supply and supplying the steam to the gasification zone;

d. providing means for elevating the temperature of the gasification zone to a temperature effective for gasification of the carbonaceous feedstock in the gasification zone;

e. contacting the carbonaceous feedstock with the steam in the gasification zone effective to produce a raw synthesis gas comprising $H_2$, CO, $CO_2$, at least one other carbonaceous material comprising at least $CH_4$, and contaminants comprising particulates, ammonia or HCl, sulphurous gas and optionally containing inert gas such as $N_2$;

f. recovering from the gasification zone the raw synthesis gas;

g. supplying at least a portion of the raw synthesis gas to a partial oxidation zone maintained at elevated temperature;

h. contacting the raw synthesis gas with an oxygen-containing gas in the partial oxidation zone effective at least partially to oxidise the at least one other carbonaceous material to provide a partially oxidised raw synthesis gas comprising $H_2$, CO, $CO_2$ and contaminants comprising particulates, ammonia or HCl, and sulphurous gas;

i. recovering the partially oxidised synthesis gas from the partial oxidation zone;

j. supplying at least a portion of the partially oxidised raw synthesis gas to a primary clean-up zone supplied with an aqueous stream at least partially to wash particulates and ammonia or HCl out of the partially oxidised raw synthesis gas, the aqueous stream being selected to be a neutral or acidic aqueous stream when ammonia is a contaminant in the partially oxidised raw synthesis gas and being selected to comprise a basic aqueous stream when HCl is a contaminant in the partially oxidised raw synthesis gas, to provide an aqueous-washed partially oxidised raw synthesis gas comprising $H_2$, CO, $CO_2$ and contaminants comprising sulphurous gas;

k. supplying at least a first part of the aqueous-washed partially oxidised raw synthesis gas to a shift reaction or adjustment zone and shifting the $H_2$ to CO ratio of the aqueous-washed partially oxidised raw synthesis gas to a selected ratio to provide a shifted aqueous-washed partially oxidised raw synthesis gas comprising $H_2$, CO, $CO_2$ and, optionally, remaining contaminants;

l. supplying at least a portion of the shifted aqueous-washed partially oxidised raw synthesis gas, optionally after recombining it with at least part of any remaining part of the aqueous-washed partially oxidised raw synthesis gas from step j, to a secondary clean-up zone;

m. contacting the shifted aqueous-washed partially oxidised raw synthesis gas in the secondary clean-up zone with a physical solvent for sulphurous materials effective at least partially to absorb sulphurous materials from the shifted aqueous-washed partially oxidised raw synthesis gas and recovering from the secondary clean-up zone an at least partially desulphurised shifted aqueous-washed partially oxidised raw synthesis gas comprising $H_2$, CO, $CO_2$ and, optionally, remaining contaminants;

n. supplying the at least partially desulphurised shifted aqueous-washed partially oxidised raw synthesis gas to a tertiary clean-up zone;

o. contacting the at least partially desulphurised shifted aqueous-washed partially oxidised raw synthesis gas in the tertiary clean-up zone with a physical solvent for $CO_2$ effective at least partially to absorb $CO_2$ from the shifted at least partially desulphurised aqueous-washed partially oxidised raw synthesis gas, and recovering from the tertiary clean-up zone a first stream comprising the physical solvent for $CO_2$ and absorbed $CO_2$, and a second stream comprising clean synthesis gas comprising $H_2$, CO and optionally remaining contaminants;

p. removing at least part of the absorbed $CO_2$ from the first stream in a solvent regeneration stage to recover regenerated solvent and separately $CO_2$ in a form sufficiently pure for sequestration or other use;

q. supplying the clean synthesis gas of the second stream, optionally after passage through one or more guard beds and/or alternative clean-up stages at least partially to remove any remaining contaminants, to a further reaction train to generate at least one useful product.

The shift reaction or adjustment zone may be a water gas shift reaction zone. Alternatively, when hydrogen is readily available in circumstances which do not contribute unacceptably negatively to the carbon intensity of the process (e.g. when "green" or "blue" hydrogen are readily available) then the shift reaction or adjustment zone may be an adjustment zone in which a hydrogen stream (preferably a "green" or "blue" hydrogen stream) is combined with the at least partially desulphurised aqueous-washed partially oxidised raw synthesis gas or the at aqueous-washed partially oxidised raw synthesis gas, as the case may be.

In the above by "green hydrogen" is meant hydrogen obtained from the electrolysis of water using renewable energies such as wind or solar.

In the above, by "blue hydrogen" is meant hydrogen produced from natural gas, usually via steam reforming, with associated carbon capture storage.

In a fifth aspect of the invention, partial oxidation may be effected in the gasification zone. In this case according to the present invention there is provided a process for the manufacture of a useful product comprising:

a. providing a carbonaceous feedstock comprising waste materials and/or biomass;
b. supplying the carbonaceous feedstock to a gasification and partial oxidation zone;
c. providing a steam supply and an oxygen-containing gas supply and supplying the steam and the oxygen-containing gas to the gasification and partial oxidation zone;
d. elevating the temperature of the gasification and partial oxidation zone to a temperature effective for gasification and partial oxidation of the carbonaceous feedstock in the gasification zone;
e. contacting the carbonaceous feedstock with the steam and the oxygen containing gas in the gasification zone effective to produce a partially oxidised raw synthesis gas comprising $H_2$, CO, $CO_2$, and contaminants comprising particulates, ammonia or HCl, sulphurous gas and optionally containing inert gas such as $N_2$;
f. recovering the partially oxidised raw synthesis gas from the gasification and partial oxidation zone;
g. supplying at least a portion of the partially oxidised raw synthesis gas to a primary clean-up zone supplied with an aqueous stream to at least partially wash particulates and ammonia or HCl out of the partially oxidised raw synthesis gas, the aqueous stream being selected to be a neutral or acidic aqueous stream when ammonia is a contaminant in the partially oxidised raw synthesis gas and being selected to comprise a basic aqueous stream when HCl is a contaminant in the partially oxidised raw synthesis gas, to provide an aqueous-washed partially oxidised raw synthesis gas comprising $H_2$, CO, $CO_2$ and contaminants comprising sulphurous gas;
h. supplying at least a portion of the aqueous-washed partially oxidised raw synthesis gas to a secondary clean-up zone;
i. contacting the aqueous-washed partially oxidised raw synthesis gas in the secondary clean-up zone with a physical solvent for sulphurous materials effective at least partially to absorb sulphurous materials from the aqueous-washed partially oxidised raw synthesis gas and recovering from the secondary clean-up zone an at least partially desulphurised aqueous-washed partially oxidised raw synthesis gas comprising $H_2$, CO, $CO_2$ and, optionally, remaining contaminants;
j. supplying at least a first part of the at least partially desulphurised aqueous-washed partially oxidised raw synthesis gas to a water gas shift reaction zone and shifting the $H_2$ to CO ratio of the at least partially desulphurised aqueous-washed partially oxidised raw synthesis gas to a selected ratio to provide a shifted at least partially desulphurised aqueous-washed partially oxidised raw synthesis gas comprising $H_2$, CO, $CO_2$ and, optionally, remaining contaminants;
k. supplying the shifted at least partially desulphurised aqueous-washed partially oxidised raw synthesis gas, optionally after recombining it with at least part of any remaining part of the at least partially desulphurised aqueous-washed partially oxidised raw synthesis gas from step i to a tertiary clean-up zone;
l. contacting the shifted at least partially desulphurised aqueous-washed partially oxidised raw synthesis gas, optionally after recombining it with at least part of any remaining part of the at least partially desulphurised aqueous-washed partially oxidised raw synthesis gas from step k, in the tertiary clean-up zone with a physical solvent for $CO_2$ effective at least partially to absorb $CO_2$ from the shifted at least partially desulphurised aqueous-washed partially oxidised raw synthesis gas, and recovering from the tertiary clean-up zone a first stream comprising the physical solvent for $CO_2$ and absorbed $CO_2$, and a second stream comprising clean synthesis gas comprising $H_2$, CO and optionally remaining contaminants;
m. removing at least part of the absorbed $CO_2$ from the first stream in a solvent regeneration stage to recover regenerated solvent and separately $CO_2$ in a form sufficiently pure for sequestration or other use;
n. supplying the clean synthesis gas of the second stream, optionally after passage through one or more guard beds and/or alternative clean-up stages at least partially to remove any remaining contaminants, to a further reaction train to generate at least one useful product.

Also in the process of the invention which involves a single vessel for gasification and partial oxidation, the shift or adjustment stage may be effected before rather than after the secondary clean-up stage (for example, in the case of a water gas shift reaction stage, if a sulphur-tolerant water gas shift catalyst is used in the water gas shift reaction zone).

Consequently in a sixth aspect the present invention provides a process for the manufacture of a useful product comprising:

a. providing a carbonaceous feedstock comprising waste materials and/or biomass;
b. supplying the carbonaceous feedstock to a gasification and partial oxidation zone;
c. providing a steam supply and an oxygen-containing gas supply and supplying the steam and the oxygen-containing gas to the gasification and partial oxidation zone;
d. elevating the temperature of the gasification and partial oxidation zone to a temperature effective for gasification and partial oxidation of the carbonaceous feedstock in the gasification zone;
e. contacting the carbonaceous feedstock with the steam and the oxygen containing gas in the gasification zone effective to produce a partially oxidised raw synthesis gas comprising $H_2$, CO, $CO_2$, and contaminants comprising particulates, ammonia or HCl, sulphurous gas and optionally containing inert gas such as $N_2$;
f. recovering the partially oxidised raw synthesis gas from the gasification and partial oxidation zone;
g. supplying at least a portion of the partially oxidised raw synthesis gas to a primary clean-up zone supplied with an aqueous stream to at least partially wash particulates and ammonia or HCl out of the partially oxidised raw synthesis gas, the aqueous stream being selected to be a neutral or acidic aqueous stream when ammonia is a contaminant in the partially oxidised raw synthesis gas and being selected to comprise a basic aqueous stream when HCl is a contaminant in the partially oxidised raw synthesis gas, to provide an aqueous-washed partially oxidised raw synthesis gas comprising $H_2$, CO, $CO_2$ and contaminants comprising sulphurous gas;
h. supplying at least a first part of the aqueous-washed partially oxidised raw synthesis gas to a shift reaction or adjustment zone and shifting the $H_2$ to CO ratio of the aqueous-washed partially oxidised raw synthesis gas to a selected ratio to provide a shifted aqueous-washed partially oxidised raw synthesis gas comprising $H_2$, CO, $CO_2$ and, optionally, remaining contaminants;
i. supplying at least a portion of the shifted aqueous-washed partially oxidised raw synthesis gas, optionally after recombining it with at least part of any remaining part of the aqueous-washed partially oxidised raw synthesis gas from step g, to a secondary clean-up zone;

j. contacting the shifted aqueous-washed partially oxidised raw synthesis gas in the secondary clean-up zone with a physical solvent for sulphurous materials effective at least partially to absorb sulphurous materials from the shifted aqueous-washed partially oxidised raw synthesis gas and recovering from the secondary clean-up zone an at least partially desulphurised shifted aqueous-washed partially oxidised raw synthesis gas comprising $H_2$, CO, $CO_2$ and, optionally, remaining contaminants;

k. supplying the at least partially desulphurised shifted aqueous-washed partially oxidised raw synthesis gas to a tertiary clean-up zone;

l. contacting the at least partially desulphurised shifted aqueous-washed partially oxidised raw synthesis gas in the tertiary clean-up zone with a physical solvent for $CO_2$ effective at least partially to absorb $CO_2$ from the shifted at least partially desulphurised aqueous-washed partially oxidised raw synthesis gas, and recovering from the tertiary clean-up zone a first stream comprising the physical solvent for $CO_2$ and absorbed $CO_2$, and a second stream comprising clean synthesis gas comprising $H_2$, CO and optionally remaining contaminants;

m. removing at least part of the absorbed $CO_2$ from the first stream in a solvent regeneration stage to recover regenerated solvent and separately $CO_2$ in a form sufficiently pure for sequestration or other use;

n. supplying the clean synthesis gas of the second stream, optionally after passage through one or more guard beds and/or alternative clean-up stages at least partially to remove any remaining contaminants, to a further reaction train to generate at least one useful product.

Further preferred features of the invention are defined in the dependent claims. These further preferred features can be combined with any of the above-defined aspects of the invention.

DETAILED DESCRIPTION

Each of the optional or preferred features or combinations of such features described below may be utilized in the invention as defined by any one or more of its first to sixth aspects.

Synthesis Gas

Unless the context dictates otherwise, the terms "raw synthesis gas", "clean synthesis gas" and any other phrase containing the term "synthesis gas" are to be construed to mean a gas primarily comprising hydrogen and carbon monoxide. Other components such as carbon dioxide, nitrogen, argon, water, methane, tars, acid gases, higher molecular weight hydrocarbons, oils, tars, volatile metals, char, phosphorus, halides and ash may also be present. The concentration of contaminants and impurities present will be dependent on the stage of the process and carbonaceous feedstock source.

The use of such terms to describe synthesis gas should not be taken as limiting. The skilled person would understand that each of the terms is construed to mean a gas primarily comprising hydrogen and carbon monoxide.

Useful Product and Further Reaction Chain

The further reaction train may be a Fischer-Tropsch reaction train and in that case the process of the invention may comprise subjecting the clean synthesis gas to Fischer-Tropsch reaction conditions to generate one or more liquid hydrocarbons as the useful product.

The liquid hydrocarbons may optionally be upgraded to make a further useful product. At least part of the liquid hydrocarbons may be upgraded by at least one of hydroprocessing, hydrotreating, product fractionation, hydrocracking and/or hydroisomerisation.

The FT liquid upgrading unit may for example produce high quality naphtha and Synthetic Paraffinic Kerosene (SPK). Other upgraded products may for example include gasoline, diesel and waxes.

The FT liquid upgrading unit may be configured as a recycle hydrocracker.

The further useful product may optionally be a sustainable liquid transportation fuel or a gasoline blendstock. The transportation fuel or gasoline blendstock may optionally be used for aviation and/or vehicles. The sustainable liquid transportation fuel may optionally comprise high quality SPK. The gasoline blendstock may optionally comprise naphtha.

The further reaction train may also or alternatively be a methanol synthesis train, an ammonia synthesis train, an alcohol synthesis train, a water gas shift reaction train and the resulting useful product may be methanol, ammonia, alcohol or hydrogen respectively, for example.

Carbonaceous Feedstock

The carbonaceous feedstock may comprise at least one of woody biomass, municipal solid waste and/or commercial and industrial waste, for example. The carbonaceous feedstock will typically have fluctuating compositional characteristics that are dependent on the source and chemistry of the feedstock used.

The carbonaceous feedstock may be in the form of relatively large pieces. The carbonaceous feedstock may be processed to remove oversized items, recyclates, highly halogenous plastics such as PVC, metals and inert items. These items cannot be converted into synthesis gas or, in the case of PVC, create an undesirably high impurity loading in the feed supplied to the gasification zone; therefore it is preferable to remove said items prior to gasification. These items may be recycled.

The carbonaceous feedstock may be reduced to a size suitable for gasification. For example, the carbonaceous feedstock may be comminuted, shredded or chipped prior to gasification.

In some embodiments, the carbonaceous material feedstock is biomass, for example woody biomass feedstock. Examples of suitable woody feedstock may include tree length round wood, pulpwood thinnings, whole tree, limbs, branches, tops and/or waste wood.

A shredder may be used to reduce the carbonaceous material to a suitable size for the gasification zone.

In another embodiment, the carbonaceous feedstock is waste material, for example municipal solid waste and/or commercial and industrial waste.

The carbonaceous feedstock may comprise moisture. Preferably in that case, the carbonaceous feedstock is dried to at least some extent prior to gasification.

The carbonaceous feedstock may be conveyed to a dryer to reduce the moisture content to a suitable level. The moisture content may be reduced to less than about 20%, less than about 15% or less than about 10% by weight.

When waste material (as mentioned above) is used as the carbonaceous feedstock source, the feedstock may not need drying prior to entering the gasification zone. Waste material in this case may be fed directly into the gasifier after suitable pre-treatment to remove undesirable components and comminute the feedstock to a size suitable for feedstock handling.

The carbonaceous feedstock may be continuously fed into a gasification zone.

Gasification Zone

The process of the invention obtains raw synthesis gas through gasifying the carbonaceous feedstock in a gasification zone. Gasification may occur in the presence of steam and oxygen. The gasification zone may comprise a singular train, dual trains or multiple trains. Preferably, the gasification zone comprises more than one train to minimize the impact of interruptions on the plant availability.

Three primary types of commercially available gasifiers are of fixed/moving bed, entrained flow, or fluidized bed type. The gasification zone may be an indirect gasification zone in which feedstock and steam are supplied to a gasification vessel which is indirectly heated. Alternatively, the gasification zone may be a direct gasification zone in which feedstock, steam and an oxygen-containing gas are supplied to the gasification vessel and directly combusted to provide the necessary heat for gasification. Also known in the art and suitable for use in the process of the present invention are hybrid gasifiers, and gasifiers incorporating partial oxidation units. In that case it will be understood that in the process of the invention the gasification zone and the partial oxidation zone may be separate zones of a single vessel.

In one embodiment, the gasification zone comprises primarily an indirectly heated deep fluidized bed operating in the dry ash rejection mode and a secondary gasifier, for maximal conversion of the carbonaceous material. In another embodiment, the gasification zone may comprise only a primary indirectly heated fluidized bed.

The fluidised bed operating temperature may vary depending on the compositional characteristics of the carbonaceous feedstock. The fluidised bed operating temperature may be between about 400 and 1000° C., preferably between about 500 and 900° C., or more preferably between about 600 to 800° C.

Such temperature ranges of the fluidised bed have been found to avoid any constituent ash from softening and forming clinkers with the bed material.

The fluidized bed reactor may be preloaded with a quantity of inert bed media such as silica (sand) or alumina. The inert bed media may be fluidized with superheated steam and oxygen. The superheated steam and oxygen may be introduced through separate pipe nozzles.

During gasification, the fluidized bed may undergo drying (or dehydration), devolatilization (or pyrolysis) and gasification. Some combustion, water gas shift and methanation reactions may also occur.

It is desirable to have a pressure within the gasification zone that minimises the need of compression in downstream processes. It is therefore preferable for the gasification zone to have a pressure of at least about 3.5 bar if not higher, for example about 4 bar or more. Gasification zones operating at even much higher pressures such as 10 bar or more are known in the art. Gasification zones operating at even much lower pressures such as 1.5 bar or less are also known in the art. Gasification zones with all operating pressures are suitable for use in the process of the present invention.

The raw synthesis gas leaving the gasification zone may typically have an exit temperature of at least about 600° C., of at least about 700° C., or of at least about 800° C. Preferably, the raw synthesis gas leaving the gasification zone has an exit temperature of from about 700° C. to about 750° C.

The major products leaving the gasification zone are typically steam and raw synthesis gas comprised of hydrogen and carbon monoxide (CO) (the essential components of synthesis gas), carbon dioxide ($CO_2$), methane, and small amounts of nitrogen and argon. There may be additional tars such as benzene, toluene, ethyl benzene and xylene, higher hydrocarbons, waxes, oils, ash, soot, bed media components and other impurities present.

In order to obtain high-quality gas that is required for its use as a feedstock in downstream processes such as synthesis, the impurities need to be removed. Non-limiting examples of suitable synthesis include Fischer-Tropsch (FT) synthesis, ammonia synthesis, methanol synthesis, or as a hydrogen product.

Cyclones may be used to remove undesirable solid materials from the raw synthesis gas.

A tramp discharge system may be used to remove heavier contaminants from the bed material in operation of the gasification process.

Sulphur, slag and other by-products and impurities of gasification may be amenable to capture, collection and reuse. It is difficult, however, to capture, collect or reuse carbon dioxide unless it is reasonably pure—i.e. at least about 90% pure, at least about 95% pure, or at least about 99% pure. The inventive process allows for the production of high purity carbon dioxide in an otherwise practical WTL or BTL process.

Depending on the source of carbonaceous feedstock and the gasification technology, the raw synthesis gas may typically comprise between about 3 and 40% carbon dioxide, in addition to other impurities and contaminants.

The raw synthesis gas leaving the gasification zone may typically comprise a varying sulphur concentration depending on the source of the feedstock being gasified, typically in the hundreds of ppm.

The concentration of sulphur in the raw synthesis gas will influence the process conditions that are employed downstream.

Partial Oxidation Zone

At least part of the raw synthesis gas from the gasification zone is recovered and at least part of the recovered raw synthesis gas may be supplied to a partial oxidation zone (POx zone). The raw synthesis gas in the partial oxidation zone will undergo partial oxidation reactions.

Conventional partial oxidation zones known in the art are typically catalytic or non-catalytic (thermal).

The partial oxidation zone may partially combust tail gas from a downstream synthesis unit and/or syngas generated in the process and/or natural gas with preheated oxygen.

The partial oxidation zone may comprise a burner to produce a stream of hot oxygen.

The partial oxidation zone is effective sufficiently to raise the temperature of the raw synthesis gas to convert at least some of any tars, naphthalene, higher hydrocarbons and methane present into carbon oxides, hydrogen and water.

The partial oxidation zone may operate at a temperature of at least about 1100° C., at least about 1200° C. or at least about 1300° C. for example. Preferably, the partial oxidation zone operating temperature is at least about 1300° C., most preferably in the range of from about 1200° C. to about 1350° C.

The partial oxidation zone may convert residual methane, naphthalene, higher hydrocarbons and tar components into carbon oxides, hydrogen and water. Synthesis gas leaving the partial oxidation zone may be construed to be equilibrated synthesis gas.

The inventors have found that the removal/destruction of tar components, residual methane and high hydrocarbons increases the carbon utilization of the plant/facility. By converting these impurities and contaminants into synthesis gas and co-processing recycle streams, an increase in product yield can be obtained. The conversion of these undesirable components advantageously simplifies downstream processes, therefore additional purification steps are not required downstream when compared to conventional processes. This contributes to the low carbon intensity of the process according to the invention.

The equilibrated synthesis gas generates high-pressure steam when exiting the POx zone. The high-pressure steam has a high energy content and may be recovered and recycled for use in upstream and/or downstream process which allows energy to be recovered.

Recovery of heat from POx zone may typically be radiant and convective. The advantage of this recovery mode is the ability to have High Pressure steam (generated in a HRSG unit) available for use in the facility. While water quench is also an acceptable (and lower cost) heat recovery option, it negatively impacts the carbon intensity of the facility owing to the need to generate HP steam for users in the plant such as, Water Gas Shift reaction unit and gasification unit.

The solids may be removed as a slag from the POx zone.

The raw synthesis gas from the POx zone may undergo at least one of gas clean up, compression and/or sulphur removal.

The inventors have surprisingly found that there is enough water in the raw synthesis gas stream from the gasification zone to enable the POx zone to moderate the temperature, minimise soot formation, reform methane and promote the downstream water gas shift reaction. Therefore, no additional steam is required to be added directly to the raw synthesis gas, unlike in conventional methods. This reduces the amount of steam supplied for the overall process, thereby reducing carbon intensity.

The synthesis gas may be cleaned by sequentially removing ammoniacal, sulphurous and carbon dioxide impurities. The latter impurities may be considered acid gases.

The overall process according to the invention may include additional stages. Therefore, the synthesis gas cleaned by sequentially removing ammoniacal, sulphurous and carbon dioxide impurities may be, for example, raw synthesis gas and/or equilibrated synthesis gas.

The equilibrated synthesis gas leaving the partial oxidation zone will be hot and may be cooled by generating steam. Generation of superheated steam and/or saturated high pressure steam is preferable to improve process efficiency and reduce carbon intensity. The objective of the invention is to reduce the carbon intensity of a BTL or WTL process and there are a number of contributory factors of which the generation of superheated steam and/or saturated high pressure steam following partial oxidation is one in certain aspects of the invention.

The cooled equilibrated synthesis gas may be passed through a venturi scrubber to remove any water and particulates such as ash and soot. A caustic wash may for example be additionally used to remove any other impurities such as ammonia, halides, nitrous oxides and remaining particulates.

The partial oxidation zone may optionally operate at a pressure slightly or somewhat lower than that of the gasification zone (to avoid any intermediate compression requirements). The partial oxidation zone may operate at a pressure of between about 2 and 3 bar for a gasification process that operates around 3.5 bar, for example.

The inclusion of a partial oxidation zone within the process according to certain aspects of the invention offers flexibility and gives the gasification zone the ability to the handle of a wide range of feedstock with fluctuating compositional characteristics. The inventors have unexpectedly found that the use of a partial oxidation zone is able to remove hydrocarbonaceous materials such as methane, benzene, toluene, ethyl benzene, xylene, higher hydrocarbons and other tars to an extent sufficient to allow the straightforward recovery downstream in the tertiary clean-up stage of carbon dioxide in a form sufficiently pure for sequestration or other use, thereby reducing the carbon intensity of the process compared with convention WTL and BTL processes.

Water Gas Shift or Hydrogen Adjustment

At least a part of the at least partially desulphurised aqueous-washed partially oxidised raw synthesis gas from the partial oxidation zone is passed through a Water Gas Shift (WGS) unit to obtain shifted synthesis gas and optionally blended with the remaining equilibrated synthesis gas to adjust the hydrogen to carbon monoxide ratio to the desired range.

The term "water gas shift reaction" or "WGS" is to be construed as a thermochemical process comprising converting carbon monoxide and water into hydrogen and carbon dioxide. The synthesis gas obtained after the WGS reaction may be construed to be shifted (i.e. adjusted) synthesis gas.

The presence of sulphur compounds is important when considering the choice of WGS catalyst for the WGS reaction. Sulphur may be removed from the feed prior to WGS process or a sulphur tolerant WGS catalyst can be used (sour shift catalyst). Preferably, sulphur is removed from the feed prior to the WGS process.

In one embodiment, the synthesis gas entering the WGS unit is essentially a low sulphur gas (<0.1 ppmv) to enable a sweet shift. The synthesis gas entering the WGS unit may be equilibrated synthesis gas.

The process according to the present invention may further comprise sequentially removing ammoniacal, sulphurous and carbon dioxide impurities from the raw synthesis gas and recovering carbon dioxide in substantially pure form.

Sulphur compounds poison sweet shift catalysts. It is important to ensure that there is very little sulphur present in the synthesis gas entering the water gas shift reaction, if a sweet shift catalyst is to be deployed in the process. In such process configuration, sulphur removal should be carried out upstream of the water gas shift reaction.

At least part of the desulphurised synthesis gas may undergo a water gas shift reaction. The water gas shift reaction may produce shifted synthesis gas which when recombined with non-shifted gas from the partial oxidation zone or the gasification zone produces a shifted synthesis gas with a hydrogen to carbon monoxide ratio of 2.00±0.4 (preferably ±0.2). (The shifted portion may itself have a much higher hydrogen to carbon monoxide ratio—even as high as 20:1 for example—but is then recombined with non-shifted gas in appropriate proportions to achieve a recombined synthesis gas with the stated desired hydrogen to carbon monoxide ratios).

The WGS reaction is a thermochemical process comprising converting carbon monoxide and water into hydrogen and carbon dioxide. The synthesis gas obtained after the WGS reaction may be construed to be shifted synthesis gas.

The synthesis gas entering the WGS unit is essentially a low sulphur gas. The synthesis gas may be shifted synthesis gas.

The process of sequentially removing ammoniacal, sulphurous and carbon dioxide impurities from the raw synthesis gas and recovering carbon dioxide in substantially pure form may occur prior to the WGS reaction. The resulting synthesis gas may be construed to be desulphurised synthesis gas.

The removal of ammoniacal, sulphurous and carbon dioxide impurities may be a low-steam physical absorption process.

In accordance with preferred embodiments of the present invention, sulphur has been removed in upstream processes. The equilibrated gas supplied to the water gas shift unit is essentially a low sulphur containing gas.

The water gas shift reaction may use a sweet shift catalyst. The sweet shift catalyst may be a metal sulphide catalyst.

As an alternative to water gas shift the at least partially desulphurised aqueous-washed partially oxidised raw synthesis gas or the aqueous-washed partially oxidised raw synthesis gas may be adjusted by simple combination with a hydrogen stream, preferably at least partially sourced from "green" or "blue" hydrogen.

Gas Clean Up

The low-steam physical absorption process may for example be a Rectisol™ or Selexol™ process or any suitable solvent based physical absorption process.

In one embodiment, the physical absorption unit may be configured to operate a dual stage process with two separate absorber columns that contact the synthesis gas stream with methanol comprising a common methanol regeneration system. The first absorber column may selectively remove sulphur and may use a $CO_2$ saturated solvent to minimise $CO_2$ absorption in the sulphur removal column. The second absorber column may recover $CO_2$.

This technology is further described elsewhere; for example in *Fossil Fuel Emissions Control Technologies*, Bruce Miller, 2015.

Carbon dioxide may optionally be recovered in substantially pure form. The recovery of $CO_2$ may follow the WGS reaction, for example.

The WGS reaction converts carbon monoxide and water into hydrogen and carbon dioxide in the presence of high pressure superheated steam.

The use of a WGS reaction in the process according to the invention enables adjustment (or shifting) of the hydrogen to carbon monoxide ratio of the synthesis gas entering the WGS unit to a desired ratio.

The removal of ammoniacal, sulphurous and carbon dioxide impurities may be a low-steam physical absorption process.

Physical absorption processes are typically carried out at low temperatures and high pressures. The inventors have found that the use of a physical absorption process, in particular a low-steam physical absorption process, contributes to the low carbon intensity of the process according to the present invention.

Conventional prior art processes involve an amine-based gas removal solvent system to remove $CO_2$ owing to their lower power import and lower expected capital cost (CAPEX). Additionally, the sulphur removal step may be a Merichem™ redox process and also include a hydrolysis step to hydrolyse hydrogen cyanide and COS. Amine-based gas removal solvent systems are chemical absorption processes.

The inventors have advantageously found that the physical absorption process in accordance with the present invention consumes substantially less steam than conventional clean-up processes in the prior art. The use of a physical absorption process therefore contributes to the low carbon intensity of a process according to the invention.

As mentioned above, the low-steam physical absorption process may be Rectisol™ or Selexol™ process. In a non-limiting case, the low-steam physical absorption process is the Rectisol™ process.

The Rectisol™ process uses chilled methanol at low temperatures (ca $-40°$ C.) to remove acid gases, metal carbonyls and trace impurities from the synthesis gas stream via absorption.

Gaseous impurities may include acid gases such as hydrogen sulphide, carbonyl sulphide, hydrogen cyanide; and also other gases such as $CO_2$, all of which are preferentially absorbed in high preference to methane, hydrogen and carbon monoxide. Trace impurities that may be removed include HCN, $NH_3$ and formic acid. The Rectisol™ process therefore advantageously minimises the loss of the desirable products and removes gaseous impurity components that would be otherwise detrimental to the downstream processes.

The inventors have surprisingly found the physical absorption process according to preferred embodiments of the present invention is a low-steam process that improves carbon intensity. As a non-limiting example, the Rectisol™ process uses about 2 tonnes per hour (<5,000 lb/hr) of steam based on syngas generated from 1000 STPD (dry) biomass as described in Table 1. In comparison, a prior art process involving a chemical absorption process, such as the amine-based gas removal system, uses about 50 tonnes per hour (>110,000 lb/hr) of steam for same tonnage of feedstock. It should, however, be noted that compared to the conventional amine based system, the physical absorption process requires approximately 10% higher power usage, a larger solvent makeup and about 10-15% higher CAPEX.

Therefore, the physical absorption process essentially 'gains' steam from employing the physical absorption process that would otherwise be used if an amine-based gas removal solvent system was employed. The physical absorption process in accordance with the present invention is therefore to be construed as a "low-steam physical absorption process".

The process according to the invention may optionally further comprise using at least a portion of the steam gained from the low-steam physical absorption process for use in upstream and/or downstream processes. The upstream process may be drying the carbonaceous feedstock prior to feeding it into a biomass and/or waste boiler and/or used in an oxygen heater for the air separation unit and/or for pre-heating the FT feed. If further LP steam is available, it may be let down to a low-low pressure (LLP) header and used for the heating of the FT guard bed(s) and/or in the upgrading section and/or in the wastewater stripping section (for example, wastewater reboiler) and/or in the fuel system (for example, natural gas heater) and/or in the deaerator and/or heating and tracing of intermediate or chemical storage tanks.

The inventors have found that using at least a portion of the steam gained from the low-steam physical absorption process in drying the feedstock prior to feeding to the biomass or waste boiler substantially reduces the carbon intensity of the process.

The ammoniacal, sulphurous and carbon dioxide impurities removed may include at least one of hydrogen sulphide, carbonyl sulphide, hydrogen cyanide, $NH_3$ and/or $CO_2$. The presence of these impurities can be detrimental to downstream processes and therefore the removal of these impurities is desirable.

The use of a low-steam physical absorption processes may result in synthesis gas with extremely low total sulphur content. The removal of sulphur components eliminates the requirement for additional synthesis gas purification in downstream processes. The low amount of trace contaminants in the synthesis gas may increase the run time on absorbents and provide greater assurance of synthesis gas purity.

The compounds absorbed may be removed from the methanol solvent by flashing (desorption) and additional thermal regeneration, for example. This allows the solvent to be ready for new absorption.

In one embodiment, the plant may comprise two separate Rectisol™ absorber columns that contact the synthesis gas stream with methanol comprising a common methanol regeneration system. The first absorber column may selectively remove sulphur and uses a $CO_2$ saturated solvent to minimise $CO_2$ absorption in the sulphur removal column. The second absorber column may recover $CO_2$.

This arrangement allows for the selective removal of sulphur from the synthesis gas, followed by the subsequent removal of $CO_2$. At least a portion of the resulting $CO_2$ stream may be reused in the process.

In variants of the invention which do not utilize a partial oxidation zone it is also desired to remove tars either by condensation prior to the sulfur removal bed or by using the physical absorption solvent to absorb tars and recovering them from the solvent regeneration stage.

The resulting synthesis gas may be construed to be desulphurised synthesis gas.

The sulphur rich off-stream gas may optionally be combusted with an excess of air in an incinerator to convert all sulphur containing compounds to $SO_2$. The incinerator may optionally operate at a temperature of about 1500° C. The $SO_2$ may for example be scrubbed into sulphate.

The resulting gas may for example be used to raise steam and may therefore in that case be cooled. The cooled synthesis gas may optionally be washed with sodium hydroxide solution to remove the $SO_2$ as sodium sulphite and sodium sulphate.

Carbon dioxide may optionally be recovered in substantially pure form. The carbon dioxide may for example be essentially sulphur free.

At least a part of the recovered substantially pure carbon dioxide may optionally be sequestered. Sequestering carbon dioxide may involve separating, compressing, and transporting carbon dioxide to an appropriate geologic formation, where it is injected and stored permanently underground.

Additionally, or alternatively, at least a part of the recovered pure carbon dioxide may optionally be used for upstream and/or downstream processes, with minimal clean up required.

The recovered pure carbon dioxide thus generated may be at least about 60%, at least about 70%, at least about 80%, or at least about 85% pure.

The generation of pure $CO_2$ as a result of the low-steam physical absorption process significantly reduces the carbon intensity of the process.

As a non-limiting example, a carbon intensity reduction of about 110 $gCO_2e/MJ$ is obtained if $CO_2$ is sequestered or used in upstream and/or downstream processes.

As is disclosed in our co-pending application 18-005 the synthesis gas hydrogen to carbon monoxide ratio may be equilibrated in the partial oxidation zone prior to entering the WGS shift unit; in this case the fluctuation of the hydrogen to carbon monoxide ratio in the synthesis gas has already been substantially reduced. The resulting shifted synthesis gas may optionally be blended with the remainder of the equilibrated synthesis gas (forming the optionally adjusted fine synthesis gas) therefore obtains a desired hydrogen to carbon monoxide ratio specific to the intended synthesis, with an even reduced fluctuation.

At least a portion of the equilibrated synthesis gas and/or raw synthesis gas may be bypassed without subjecting said synthesis gas to a WGS reaction or alternative hydrogen adjustment stage, thereafter, combining said shifted and bypassed gas into optimal proportions to obtain the desired hydrogen to carbon monoxide feed ratio in the optionally adjusted fine synthesis gas. The proportion of gas bypassed will vary depending on the desired ratio of the synthesis reaction downstream and the severity of the shift reaction. Controlling the proportion of bypassed gas sent to the reactors helps in obtaining specific hydrogen to carbon monoxide feed ratios.

As a non-limiting example, it is generally needed to increase the hydrogen to carbon monoxide ratio of the equilibrated synthesis gas generated from biomass or waste gasification when wanting to supply shifted synthesis gas to a Fisher-Tropsch reactor.

HRU

Hydrogen may be recovered from the shifted synthesis gas downstream of the water gas shift reaction. Hydrogen may be recovered from several stages of the process according to the invention. The inventors found recovering hydrogen from downstream the acid gas removal process from the shifted gas stream proved to be the most effective. The inventors found the loss of CO from the overall process was less when compared to hydrogen recovery at other locations. Therefore, the overall economics of the facility is improved due to an increase in product yield, which hydrogen recovery is employed after removal of the ammoniacal, sulphurous and carbon dioxide impurities.

At least a portion of the shifted synthesis gas may optionally be sent to a Hydrogen Recovery Unit (HRU). The HRU may utilize a Pressure Swing Adsorption (PSA) process to produce high purity hydrogen for different uses. The high purity hydrogen may be used in upstream and/or downstream processes. The offgas from HRU may be used as a fuel gas to reach required combustion temperatures in the incinerators, further reducing the carbon intensity of the inventive process.

The high purity hydrogen from the HRU may for example be about at least 97%, at least about 98%, and least about 99% pure, at pressure. Impurities that are removed may include, but are not limited to, CO, $CO_2$, $CH_4$, $N_2$ and Ar.

The upstream and/or downstream processes utilizing the recovered hydrogen may for example include removal of at least one of the ammoniacal, or sulphurous or carbon dioxide impurities, catalyst regeneration of synthesis reactors and product upgrading.

The shifted synthesis gas from the WGS unit combined with bypassed synthesis gas may optionally pass through an inlet filtration system, for example an inlet guard bed, prior to the synthesis unit.

The inlet guard bed may optionally be a sulphur guard bed.

The inlet guard bed may for example operate in a lead-lag configuration to remove residual traces of contaminants such as hydrogen sulphide, phosphorus, COS, arsenic, chlorides and mercury from the synthesis gas. The lead bed may for example remove any contaminants present and the lag may for example serve as a safeguard for when the lead bed breaks through.

The synthesis gas leaving the guard bed may be construed as optionally adjusted fine synthesis gas.

Product

Synthesis gas may be converted into a useful product, for example a long chain hydrocarbon product, hydrocarbon fuel or liquid or solid hydrocarbon.

The synthesis gas may be, but is not limited to, shifted synthesis gas, desulphurised synthesis gas and/or fresh synthesis gas.

The useful product may for example comprise liquid hydrocarbons. The liquid hydrocarbons may be sustainable liquid transportation fuels.

The useful product may for example be produced by subjecting at least part of the synthesis gas to a Fischer-Tropsch synthesis unit.

The products obtained in the FT synthesis may include for example heavy FT liquid (HFTL) and light FT liquid (LFTL) fractions, naphtha, and tail gas comprising inerts as well as uncondensed light hydrocarbons, typically $C_1$ to $C_4$. FT process water may also be generated. A part of the tail gas comprising light hydrocarbons, $C_1$ to $C_4$ range, may optionally be recycled back to the POx zone or sent to a fuel gas system.

A part of the tail gas stream may optionally be combined with the fresh synthesis gas prior to being fed to the FT reactors to maximize the utilization of CO available in the synthesis gas. In such instances, a purge stream may be used to prevent build-up of inert gases, such as $CO_2$ and $CH_4$, that are produced in the FT reactors. The use of tail gas stream as a fuel described above would qualify as a purge stream as the gases leave the process loop.

The liquid hydrocarbons may optionally be upgraded to make a useful product.

At least part of the liquid hydrocarbons may optionally be upgraded by at least one of hydroprocessing, hydrotreating, product fractionation, hydrocracking and/or hydroisomerisation.

The FT liquid upgrading unit may for example produce high quality naphtha and Synthetic Paraffinic Kerosene (SPK). Other upgraded products may include gasoline, diesel and waxes for example.

The FT liquid upgrading unit may for example comprise a recycle hydrocracker.

The useful product may for example be sustainable liquid transportation fuel or a gasoline blendstock. The transportation fuel or gasoline blendstock may be used for aviation and/or vehicles.

The sustainable liquid transportation fuel may for example comprise high quality diesel and/or SPK.

The gasoline blendstock may for example comprise naphtha.

The process according to preferred embodiments of the present invention may produce transport (aviation and road) fuels with fewer greenhouse gas emissions compared to conventional fuel. The reduction in greenhouse gas emissions may be at least about 50%, at least about 60%, or at least about 70% compared with conventional processes.

Depending on the feedstock, fuels made using the process according to the invention, typically enable significant greenhouse gas reductions. The process according to preferred embodiments of the present invention may enable the production of aviation and road fuels with at least about 70% fewer greenhouse gas emissions compared to conventional fuel.

A purge gas stream from the FT reactors (FT tailgas) and a small off gas stream from the FT liquids upgrading system may optionally be recycled to the upstream process (for example to the gasification or partial oxidation zone) to improve the overall carbon recovery.

In preferred embodiments, the process according to the present invention aims to utilize any off gas produced during any stage of the process according to the invention for power generation where appropriate to reduce the consumption of natural gas or other external fuel source.

For avoidance of doubt, all features relating to the process for manufacture of a useful product from carbonaceous feedstock of fluctuating compositional characteristics, also relate, where appropriate, to the low carbon intensity process and vice versa.

Optionally adjusted fine synthesis gas may be converted into a useful product.

The useful product may for example comprise liquid hydrocarbons. The liquid hydrocarbons may for example be sustainable liquid transportation fuels.

The useful product may for example be produced by subjecting at least part of the optionally adjusted fine synthesis gas to a Fischer-Tropsch synthesis unit.

At least a portion of the synthesis gas may for example be fed into a synthesis unit. Non-limiting examples of suitable synthesis include Fischer-Tropsch, ammonia synthesis, methanol synthesis, alcohol synthesis or as a hydrogen product.

Synthesis reactions require specific hydrogen to carbon monoxide ratio in feed gas ("desired ratio") for optimum performance to meet process requirements, maximise conversion and product yield. As a non-limiting example, the Fischer-Tropsch synthesis feed may have a hydrogen to carbon monoxide ratio of about 2. This desired ratio is typically lower than the usage ratio. As a non-limiting example, the Fischer-Tropsch synthesis usage ratio may be in the 2.04-2.14 range, typically about 2.1.

According to the embodiment relating to Fischer-Tropsch synthesis, the optionally adjusted fine synthesis gas may be fed into a FT reactor.

The synthesis unit may be a FT unit comprising FT reactors.

The FT reactors may optionally comprise microchannels.

Filters may optionally be used to remove any particulates.

The FT reactor may optionally convert at least part of the carbon monoxide and hydrogen of the optionally adjusted fine synthesis gas into mainly linear hydrocarbons.

The Fischer-Tropsch synthesis unit may optionally convert the optionally adjusted fine synthesis gas into liquid hydrocarbons.

The conversion of synthesis gas into liquid hydrocarbons may optionally be in the presence of a catalyst. The chain length distribution may be dependent on the properties of the catalyst used and the operating conditions.

Fischer-Tropsch reactions are exothermic and release heat that must be removed to keep the temperature of the reaction approximately constant. Localised high temperatures in the catalyst bed have been found to adversely affect the FT product mix, yield and potentially reduce catalyst life. Therefore, it is desirable to keep the temperature constant.

The temperature may optionally be controlled by varying pressure of a steam drum associated with the FT reactor used in conjunction with circulating cooling water.

The operating temperature for the FT synthesis may optionally be between about 125 and 350° C., between about 150 and 300° C., between about 170 and 250° C., between about 180 and 240° C. Preferably, the operating temperature is between about 180 and 240° C. for a low temperature FT technology.

The catalyst may optionally be a metal or compounded metal catalyst with a support. In one embodiment, the metal is cobalt. The support may optionally be made from silica, zirconia and/or titania.

A part of the tail gas stream may optionally be combined with the fresh synthesis gas prior to being fed to the FT reactors to maximize the utilization of CO available in the synthesis gas. In such instances, a purge stream may optionally be used to prevent build-up of inert gases, such as $CO_2$ and $CH_4$, that are produced in the FT reactors. The use of the tail gas stream as a fuel described above would qualify as a purge stream as the gases leave the process loop.

It is desirable to upgrade the liquid hydrocarbons into a further useful product.

The liquid hydrocarbons may for example be upgraded to make a further useful product. At least part of the liquid hydrocarbons may for example be upgraded by at least one of hydroprocessing, hydrotreating, product fractionation, hydrocracking and/or hydroisomerisation.

The FT liquid upgrading unit may for example produce high quality naphtha and Synthetic Paraffinic Kerosene (SPK). Other upgraded products may for example include gasoline, diesel and waxes. The unit may for example be configured as a recycle hydrocracker.

The further useful product may for example be a sustainable liquid transportation fuel or a gasoline blendstock. The transportation fuel or gasoline blendstock may for example be used for aviation and/or vehicles. The sustainable liquid transportation fuel may for example comprise high quality SPK or diesel. The gasoline blendstock may for example comprise naphtha.

The products formed by a process according to the present invention may for example constitute cleaner versions of fuels formed by conventional processes.

The fuel produced according to the present invention may for example improve air quality, with up to 90% reduction in particulate matter (soot) from aircraft engine exhausts and almost 100% reduction in sulphur oxides.

Figure 1:
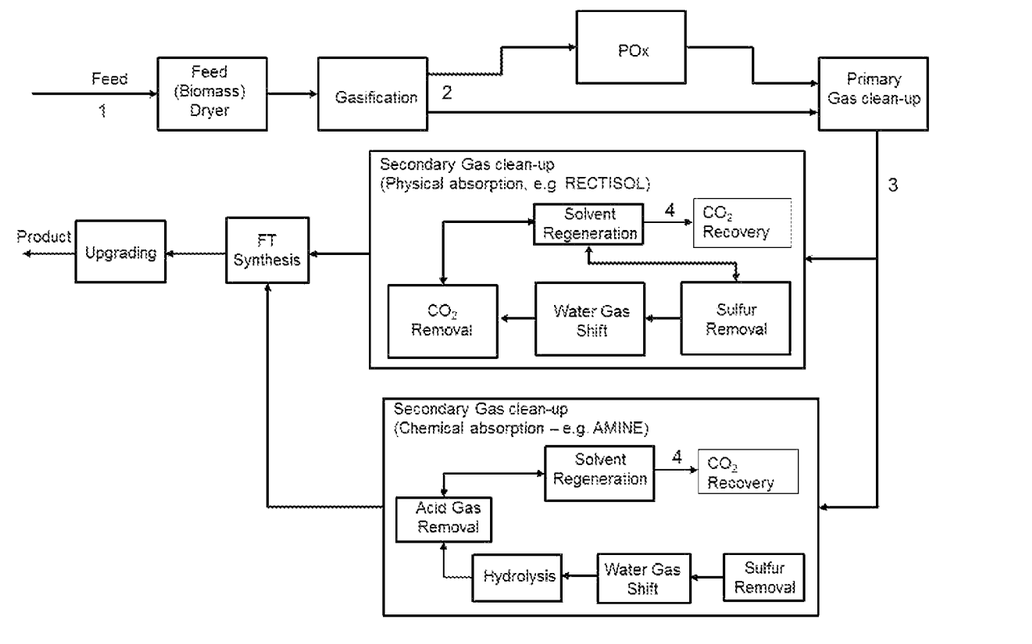
FIG. 1 depicts a schematic diagram of a process for undertaking FT synthesis from a biomass and/or waste feedstock. The schematic diagram depicts both the conventional teaching in the prior art (chemical absorption secondary gas clean-up route) and a process according to the present invention (physical absorption secondary gas clean-up route). Also illustrated are two aspects of the inventive process both with and without a partial oxidation zone.

Referring to FIG. 1, prior art processes conventionally involve an amine-based gas removal solvent system to remove $CO_2$, a Merichem™ redox process to remove sulphur and a hydrolysis step to hydrolyse hydrogen cyanide and COS.

Comparing the amine-based clean-up route to the physical absorption route according to the present invention, there are fewer stages that are required, thus simplifying the overall process and providing a process with a reduced number of stages. The reduced number of stages stems from the ability of the physical absorption process to effectively remove HCN, COS and other mercaptans which would have needed an additional hydrolysis step per the conventional route.

Preferred embodiments of the invention will now be more specifically described with reference to the following non-limiting examples.

EXAMPLES

A woody biomass feedstock was selected.
Process
The selected feedstock is treated as follows:
The feedstock is initially processed by comminuting it to the required size and drying to a desired moisture content (in this case 10%) to obtain dried biomass feedstock.

The dried biomass feedstock is supplied continuously to a fluidised bed gasification unit operated at a temperature of <800° C., a pressure of 2.2 barg and supplied with superheated steam to effect the gasification and produce approximately 5-10 or 1-2 lbmols/hr of raw synthesis gas per short ton of feed per day (STPD).

In one route the raw synthesis gas exits the gasifier and is supplied to an oxygen-fired partial oxidation reactor maintained at a temperature of approximately 1,250° C. and supplied with all of the raw synthesis gas generated from the gasification step described above while adjusting the oxygen rate to achieve a target temperature. The partial oxidation reaction converts residual methane and other hydrocarbons into synthesis gas.

The resulting hot equilibrated synthesis gas is cooled (by generating superheated and saturated high-pressure steam) to a temperature below 200° C. and is then routed through a primary gas cleanup unit where it passes through a venturi scrubber to knock-out water and particulates (such as soot and ash), after which it is caustic-washed to remove ammonia, halides (eg HCl), nitrous oxides and any remaining particulates.

In an alternative route, the raw synthesis gas that exits the gasifier is supplied straight to primary gas clean-up, bypassing the oxygen-fired partial oxidation reactor.

The synthesis gas is then compressed and routed through a secondary gas cleanup and compression system in which acid gas ($H_2S$ and $CO_2$) removal is effected by the Rectisol™ process using a methanol solvent which "sweetens" the synthesis gas. This approach is used in Examples 1 and 2 discussed below. Example A depicts the conventional prior art involving an amine-based $CO_2$ removal step followed by a sulphur removal step using Merichem™ redox process and a hydrolysis step to hydrolyse hydrogen cyanide and COS.

Approximately 2.2 lbmol/hr/STPD of acid gas is sent to the battery limit for $CO_2$ capture. The acid gas stream comprises small quantities of $H_2$ (<0.5 mol %), CO (<0.5 mol %), $H_2O$ (<5%) and $N_2$ (~10%). The quantity of $CO_2$ removed is about 1.5 lbmol/hr/STPD.

A portion of synthesis gas is extracted and recycled as fuel for the gasifier.

A portion of the synthesis gas stream is passed through a Water Gas Shift (WGS) unit to adjust the hydrogen to carbon monoxide ($H_2$:CO) ratio in the total feed stream as it recombines.

A portion of the water gas shifted-synthesis gas is sent to a hydrogen recovery unit to produce high purity hydrogen for use in downstream units. The high purity hydrogen is sent downstream and the tail gas is routed to fuel gas.

Throughout the secondary gas cleanup process various guard beds are positioned to remove materials such as mercury, arsenic and phosphorus.

The sweetened and shifted synthesis gas is passed through a final Fischer-Tropsch (FT) inlet guard bed before being sent to the FT Synthesis Unit.

Purified synthesis gas is sent to the FT microchannel reactors where, in the presence of a cobalt catalyst supported on a silica/titania support, it is converted into synthetic liquid hydrocarbons.

Purged/excess tailgas is sent to the POx and the fuel gas system.

The FT reaction water is sent to the wastewater treatment unit where it is fractionated into a distillate containing alcohols and a bottoms fraction containing organic acids.

The bottom stream is then upgraded biologically for reuse in the facility.

The synthetic FT liquids are hydrocracked, hydroisomerised and then hydrotreated. Subsequently the diesel fuel is obtained from the upgrading unit.

Wastewater recovered from different process units is sent to a Wastewater Treatment unit before disposal or possible reuse.

Results

Table 1 outlines both individual stages and outcomes that are present in the process for undertaking FT synthesis from the selected feedstock.

TABLE 1

|  | Example A | Example 1 | Example 2 |
|---|---|---|---|
| Biomass dry (STPD) | 1,000 | 1X | 1X |
| Amount of syngas produced from gasification (lbmol/h/stpd) | ~8 | 1X | 1X |
| $O_2$ usage from gasification + POx (lb/h/stpd) | ~50 | 0.35X | 1X |
| Syngas compression power/duty (MW) | ~10 | 0.80X | 1X |
| Amount of syngas to FT synthesis (lbmol/h/stpd) | ~5 | 0.75X | 1X |
| BTX product, BPD (relative to FT C5+ in base case) | 0 | 0.06X | 0 |
| FT C5+ product (BPD) | ~1500 | 0.65X | 1X |
| Total C5+ product (BPD) | ~1500 | 0.71X | 1X |
| Power import (MW) | ~24 | 0.84X | 0.95X |
| Natural gas import (MMSCFD) | ~6 | 0 | 0.85X |
| CI score of overall process (g($CO_2$- eq)/MJ) | X | 0.50X | 0.85X |
| $CO_2$ removed (lbmol/hr/STPD) | 1.5 | 1.0 | 1.6 |

Key to Table 1:
Example A Comparative example using a conventional chemical absorption process for gas clean-up.
Example 1 Example according to the present invention using a physical absorption process for gas clean-up without the use of a POx reactor.
Example 2 Example according to the present invention using a physical absorption process for gas clean-up and including the use of a POx reactor.

The values of Examples 1 and 2 in Table 1 are reported relative to comparative Example A. For example, the $O_2$ usage of comparative Example A is ~50 lb/h/stpd. Example 1 is 0.35× the value of Example A, thus having an $O_2$ usage of ~17.5 lb/h/stpd.

It will be seen in comparing Examples 1 and 2 according to the present invention to comparative Example A that power import and natural gas import in the process are significantly reduced (and thus improved CI) when the physical absorption process (Rectisol™) is used in accordance with the present invention in replacement of the conventional chemical absorption process (amine).

Additionally, the use of a physical absorption process in accordance with the present invention does not require an auxiliary boiler to generate low pressure steam, like in conventional methods such as used in comparative Example A. The Rectisol process of Examples 1 and 2 according to the invention utilizes saved steam from downstream processes and utilizes the steam for use in upstream processes, such as drying the biomass, therefore reducing the natural gas import. The Examples according to the present invention therefore provide a more environmentally friendly method compared to comparative Example A.

In the case of the absence of a POx zone, additional energy efficiency is gained from the lower $O_2$ utilization (only needed in gasification stage) and results in a smaller ASU and ancillary equipment. Although some tars can be recovered as BTX and used as a blendstock for fuel, the net $C_5$+ hydrocarbon production ex-FT unit is also lower since there is no POx to convert the tars and methane to syngas. This impacts the facility economics via the value of saleable products recovered. Although, the CI reduction is the highest in this case, economics may dictate the viability of this option.

It can also be seen from the results that the CI score is significantly reduced in Examples 1 and 2 when compared to comparative Example A. The reduction in CI is a result of several factors, including, but not limited to, the reduction in natural gas import, $O_2$ usage and power import. The reduction in CI is advantageous and demonstrates that the processes according to the present invention are more environmentally friendly than conventional methods.

It should also be noted that the CI score indicated in the table is without incorporating $CO_2$ sequestration, which would be expected to be used in accordance with the present invention. The inclusion of $CO_2$ sequestration would reduce the values in the table further.

The invention claimed is:

1. A process for the manufacture of a synthetic fuel comprising:
   a. gasifying a carbonaceous feedstock comprising waste materials and/or biomass to generate a raw synthesis gas comprising $H_2$, CO, $CO_2$, at least one other carbonaceous material comprising at least $CH_4$ and tars, and contaminants comprising particulates, ammonia or HCl, and sulphurous gas;
   b. supplying at least a portion of the raw synthesis gas to a primary clean-up zone supplied with an aqueous stream at least partially to wash particulates and ammonia or HCl out of raw synthesis gas, the aqueous stream being selected to be a neutral or acidic aqueous stream when ammonia is a contaminant in the raw synthesis gas and being selected to comprise a basic aqueous stream when HCl is a contaminant in the raw synthesis gas, to provide an aqueous-washed raw synthesis gas comprising $H_2$, CO, $CO_2$ and contaminants comprising sulphurous gas;
   c. supplying at least a first part of the aqueous washed raw synthesis gas to a shift reaction or adjustment zone and shifting the $H_2$ to CO ratio of the raw synthesis gas to a selected ratio to provide a shifted raw synthesis gas comprising $H_2$, CO, and $CO_2$ and contaminants comprising sulphurous gas to produce a shifted raw synthesis gas;
   d. supplying at least a portion of the shifted raw synthesis gas to a secondary clean-up zone;
   e. contacting the shifted raw synthesis gas in the secondary clean-up zone with a physical solvent for sulphurous materials effective at least partially to absorb sulphurous materials from the aqueous-washed raw synthesis gas and recovering from the secondary clean-up zone an at least partially desulphurised, de-tarred shifted raw synthesis gas comprising $H_2$, CO and $CO_2$;
   f. supplying the at least partially desulphurised, de-tarred shifted raw synthesis gas to a tertiary clean-up zone;
   g. contacting the at least partially desulphurised, de-tarred shifted raw synthesis gas in the tertiary clean-up zone with a physical solvent for $CO_2$ effective at least partially to absorb $CO_2$ from the at least partially desulphurised, de-tarred shifted raw synthesis gas, and recovering from the tertiary clean-up zone a first stream comprising the physical solvent for $CO_2$ and absorbed $CO_2$, and a second stream comprising clean synthesis gas comprising $H_2$, CO and optionally remaining contaminants;

h. removing at least part of the absorbed $CO_2$ from the first stream in a solvent regeneration stage to recover regenerated solvent and separately $CO_2$ in a form sufficiently pure for sequestration or other use; and i. supplying the clean synthesis gas of the second stream, optionally after passage through one or more guard beds and/or alternative clean-up stages at least partially to remove any remaining contaminants, to a further reaction train to generate a synthetic fuel.

2. The process according to claim 1 wherein the carbonaceous feedstock comprises at least one of woody biomass, municipal solid waste and/or commercial and industrial waste or a combination of these and the moisture content of the feedstock is reduced to below 20% w/w prior to gasification by drying with at least a portion of steam gained from downstream processes.

3. The process according to claim 2 wherein the process further comprises using a biomass or waste boiler to produce high-pressure steam and power.

4. The process according to claim 1 wherein the removal of ammoniacal, sulphurous and/or carbon dioxide impurities is a low-steam physical absorption process.

5. The process according to claim 4 wherein the process further comprises using at least a portion of the steam gained from the low-steam physical absorption process for use in upstream and/or downstream processes.

6. The process according to claim 5 wherein the upstream process comprises drying the carbonaceous feedstock.

7. The process according to claim 1 wherein at least a part of the recovered pure carbon dioxide is sequestered or is used off site or on site is upstream and/or downstream processes.

8. The process according to claim 1 wherein the pure carbon dioxide is at least about 60% pure.

9. The process according to claim 1 wherein at least part of the desulphurised gas undergoes a water gas shift reaction to produce shifted synthesis gas.

10. The process according to claim 9 wherein the shifted synthesis is recombined with non-shifted gas to produce a synthesis gas having a hydrogen to carbon monoxide ratio of 2.00±0.4.

11. The process according to claim 1 wherein the synthetic fuel is produced by subjecting at least part of the desulphurised or shifted synthesis gas to Fischer-Tropsch reaction conditions in a Fischer-Tropsch synthesis unit.

12. The process according to claim 11 wherein the Fischer-Tropsch synthesis unit converts the desulphurised or shifted synthesis gas into liquid hydrocarbons.

13. The process according to claim 12 wherein the liquid hydrocarbons are upgraded into the synthetic fuel.

14. The process according to claim 13 wherein at least a part of the liquid hydrocarbons is upgraded by at least one of hydroprocessing, product fractionation, hydrocracking and/or isomerisation to produce the synthetic fuel.

15. The process according to claim 1 wherein the synthetic fuel comprises synthetic paraffinic kerosene and/or diesel and/or naphtha.

16. The process according to claim 15 wherein the synthetic paraffinic kerosene and/or diesel and/or naphtha is used for transportation fuel.

17. A process according to claim 1 comprising: partially oxidising the raw synthesis gas from step a) to provide a partially oxidised raw synthesis gas comprising $H_2$, CO, $CO_2$ and contaminants comprising particulates, ammonia or HCl, and sulphurous gas; and supplying at least a portion of the partially oxidised raw synthesis gas to the primary clean-up zone in step b).

18. A process according to claim 1 comprising recombining the shifted raw synthesis gas with a second part of the raw synthesis gas from step b) before supplying the combined stream on in the process to the secondary clean-up zone in step d).

19. A process according to claim 17 comprising: supplying at least a first part of the raw synthesis gas from step e) to a shift reaction or adjustment zone and shifting the $H_2$ to CO ratio of the raw synthesis gas to a selected ratio to provide a shifted raw synthesis gas comprising $H_2$, CO and $CO_2$; and supplying the shifted raw synthesis gas on in the process to the tertiary clean-up zone in step f).

20. A process according to claim 19 comprising recombining the shifted raw synthesis gas with a second part of the raw synthesis gas from step e) before supplying the combined stream on in the process to the tertiary clean-up zone in step f).

* * * * *